United States Patent [19]

Murphy

[11] Patent Number: 6,119,548
[45] Date of Patent: Sep. 19, 2000

[54] ROTATIONAL FRICTION DAMPER

[75] Inventor: Robert John Murphy, Leamington Spa, United Kingdom

[73] Assignee: Automotive Products, PLC, Leamington Spa, United Kingdom

[21] Appl. No.: 09/077,183
[22] PCT Filed: Sep. 10, 1997
[86] PCT No.: PCT/GB97/02465
  § 371 Date: Aug. 10, 1998
  § 102(e) Date: Aug. 10, 1998
[87] PCT Pub. No.: WO98/13624
  PCT Pub. Date: Apr. 2, 1998

[30] Foreign Application Priority Data

Sep. 26, 1996 [GB] United Kingdom .................. 9620036

[51] Int. Cl.[7] .................................................. F16F 15/139
[52] U.S. Cl. ............................................. 74/574; 464/68
[58] Field of Search ......................... 74/574; 192/214.1, 192/213.31, 213.22, 213.12; 464/68

[56] References Cited

U.S. PATENT DOCUMENTS

| 4,887,485 | 12/1989 | Kobayashi et al. ........................ 74/574 |
| 5,526,714 | 6/1996 | Schierling ................................. 74/574 |
| 5,577,582 | 11/1996 | Lindsay . | |
| 5,816,925 | 10/1998 | Mizukami .......................... 192/213.22 |

FOREIGN PATENT DOCUMENTS

WO96/29525  9/1996  WIPO .

Primary Examiner—Mary Ann Battista
Attorney, Agent, or Firm—Paul E Milliken; Ray L Weber; Lee A Germain

[57] ABSTRACT

A twin mass flywheel (10) having a friction damper (50) and a friction plate (55) with a shaped radially outer (55a) or radially inner first periphery which cooperates with a similarly shaped first periphery of a further component (54) of the damper to transfer torque between the friction plate (55) and the further component, the first periphery of the friction plate comprising a plurality of drive surfaces (55B), at least one of which is substantially tangential or chordal to the friction plate (55). The friction plate (55) may additionally have a second periphery with second drive surfaces tangential or chordal to the friction plate or it may additionally have drive formations formed as axially projecting lugs on an axially orientated surface of the friction plate. The friction plate (55) may be manufactured by sintering techniques or may have a sintered coating applied to its friction surface. A friction plate manufactured by sintering techniques may have sintered unitary ramps, and/or lip, and/or lugs provided thereon. The friction damper (50) is shown with at least two friction surfaces (54, 55) which rotate relative to each other and are biased by a load into engagement with each other during at least part of the relative rotation and the bias load is reacted by an inner (19A) or outer (19B) race of bearing (19) the said inner (19A) or outer (19B) race being axially fixed between a shoulder and a plate of the twin mass flywheel (10).

17 Claims, 3 Drawing Sheets

ROTATIONAL FRICTION DAMPER

FIELD OF THE INVENTION

The present invention relates to friction plates and friction dampers and in particular though not exclusively to friction plates and friction dampers for a twin mass flywheel.

BACKGROUND OF THE INVENTION

In the Applicant's earlier co-pending patent application PCT/GB96/00675 there is described a friction damper with sheet metal friction plates in which torque is transferred from a friction plate to a cooperating further component by radially extending tags of the friction plate engaging slots in the further component. This can result in relatively high stresses in the region of the tags and slots.

OBJECTS OF THE INVENTION

It is an object of the present invention to provide a twin mass flywheel having an improved form of friction damper. It is a further object of the present invention to provide a friction damper which is cheap and simple to produce and is of a compact design.

BRIEF SUMMARY OF THE INVENTION

This invention relates to a twin mass flywheel having a first mass and a second mass arranged for relative rotation about a common axis, the relative rotation of the masses being controlled, at least in part, by a friction damper, said friction damper comprising at least one friction plate rotatable about said common axis and having a shaped radially outer or radially inner first peripheral surface which co-operates with a similarly shaped peripheral surface of a first further component to transfer torque between said first further component and said at least one friction plate, said first further component being arranged for rotation with one of said flywheel masses, said shaped first peripheral surface of said at least one friction plate comprising a plurality of drive surfaces, at least one of said drive surfaces being substantially tangential or chordal to a circle drawn concentric with said common axis.

The friction plate may additionally have a second periphery with second drive surfaces tangential or chordal to the friction plate or it may additionally have drive formations formed as axially projecting lugs on an axially orientated surface of the friction plate.

Also in accordance with the present invention there is provided a friction plate for use in a friction damper or similar device in which the friction plate is manufactured by sintering techniques or in which a sintered coating is applied to a friction surface of the friction plate. In particular a friction plate manufactured by sintering techniques may have sintered unitary ramps, and/or lip, and/or lugs provided thereon.

Also in accordance with the present invention there is provided a friction plate for use in a friction damper or similar device in which the friction plate has shaped first drive formations which cooperate with correspondingly shaped second drive formations of a further component of the damper to transfer torque between the friction plate and the further component, the first drive formations containing a plurality of drive surfaces formed as axially projecting lugs on an axially orientated surface of the friction plate. The invention also provides a twin mass flywheel including a friction damper with at least 2 friction surfaces which rotate relative to each other and are biased by a load into engagement with each other during at least part of the relative rotation and the bias load is reacted by an inner or outer race of a bearing the said inner or outer race being axially fixed between two additional components of the twin mass flywheel.

BRIEF ESCRIPTION OF THE VIEWS OF THE DRAWINGS

Embodiments of the present invention shall now be described by way of example only, with reference to the accompanying drawings in which.

DETAILED DESCRIPTION OF THE INVENTION

Figure 1:
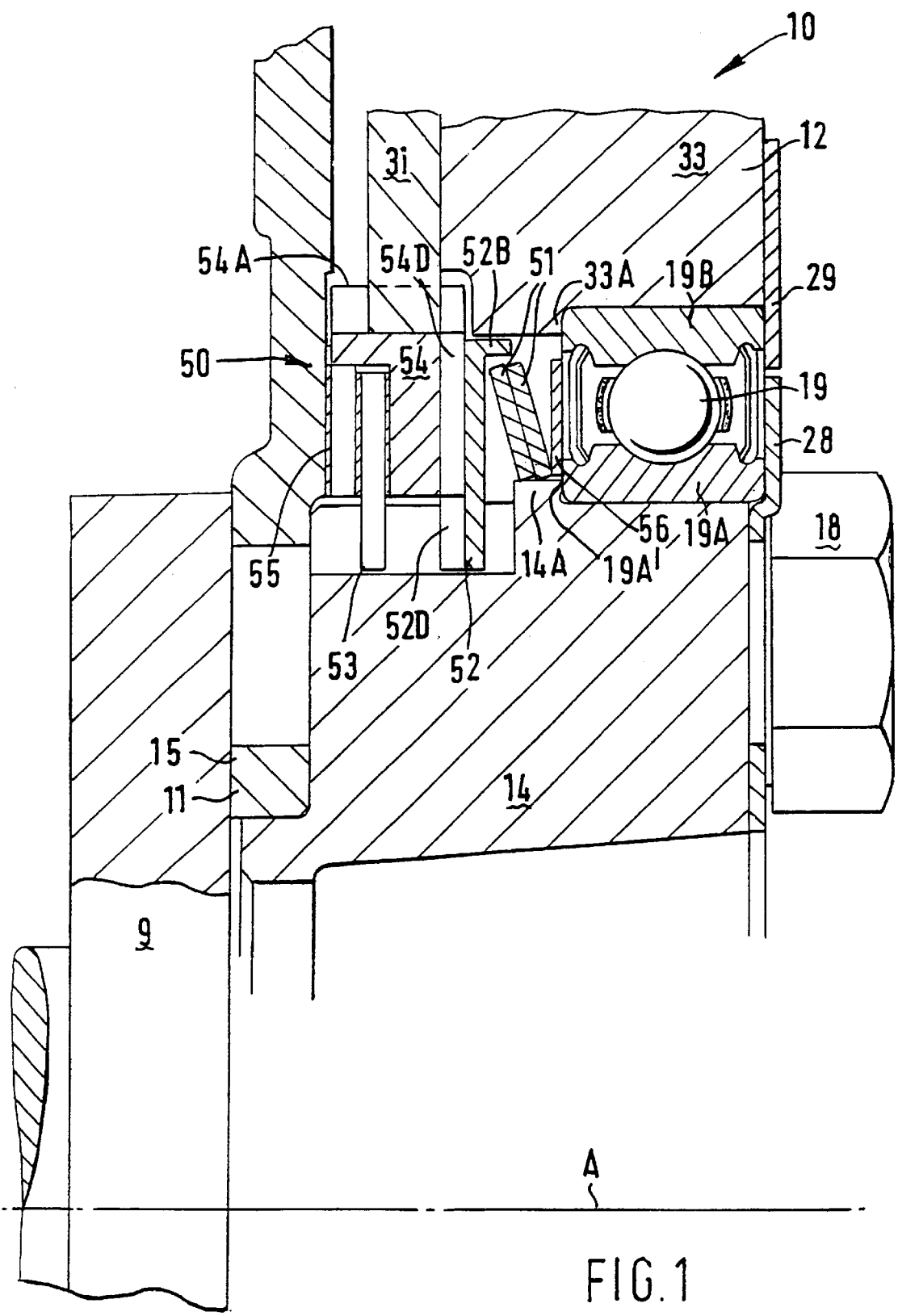
FIG. 1 is a cross section view of a twin mass flywheel incorporating a friction damper according to the present invention.

FIG. 1 shows a twin mass flywheel 10 which rotates about an axis A. The flywheel 10 comprises an input flywheel 11 attached to a crankshaft 9 of an engine (not shown) by bolts 18, and an output flywheel 12 which is rotatably mounted on input flywheel 11 by bearing 19. Input flywheel 11 primarily comprises hub 14 and plate 15 and output flywheel 12 primarily comprises plate 31 and boss 33. The inner race 19A of bearing 19 is clamped axially fast between abutment 14A of hub 14 and plate 28. The outer race 19B is similarly clamped axially fast between abutment 33A and plate 29. Relative rotation between input flywheel 11 and output flywheel 12 is primarily controlled by a set of bob weight linkages (not shown) mounted at the radially outer portions of the flywheel. Such bob weight linkages as shown in the applicant's earlier patent GB 2 229 793. However the present invention is in particular also applicable to other types of known twin mass flywheel for example twin mass flywheels which use circumferential springs to control relative rotation between the input and output flywheels. Flywheel 12 is attached to a clutch (not shown).

Figure 2:
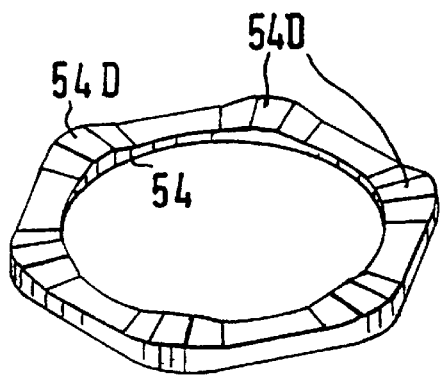
FIGS. 2 to 7 are isometric views of various friction components of the friction damper shown in FIG. 1
Figure 3:
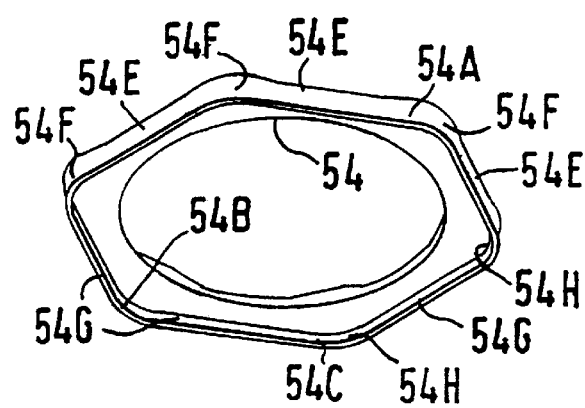
Figure 4:
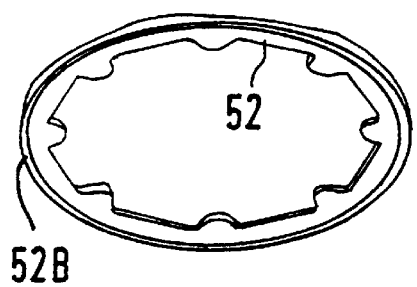
Figure 5:
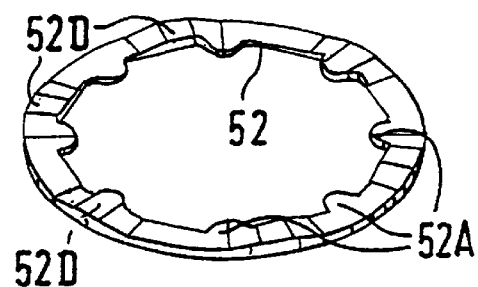
Figure 6:
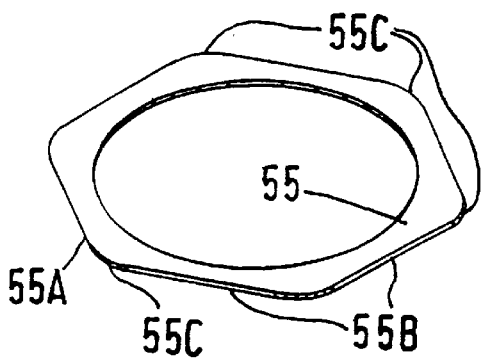
Figure 7:
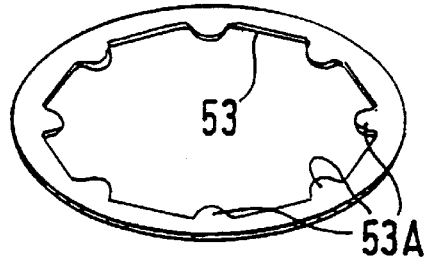

Relative rotation of the flwyheel masses is also controlled by the friction damper 50. Friction damper 50 is in the form of a stack of generally annular components as follows:— a) friction plate 55 (see FIG. 6) which has an outer periphery 55A (in this case of generally hexagonal shape) which engages rotationally fast with friction plate 54 (see below). The outer periphery 55A is comprised of six drive surfaces 55B. Each pair of adjacent drive surfaces 55B are blended into each other by a curve 55C.

b) friction plate 53 (see FIG. 7)which has engaging tab portion 53A on its inner periphery to engage rotationally fast with the hub 14.

c) friction plate 54 (see FIGS. 2 and 3) which has an outer first periphery 54A (in this case of generally hexagonal shape) which engages rotationally fast with plate 31. The outer first periphery 54A is comprised of six drive surfaces 54E. Each pair of adjacent drive surfaces 54E are blended into each other by a curve 54F. Part of the outer first periphery 54A is constituted by the outer part of a lip 54B. The radially inwardly facing portion of the lip 54B defines a second radially inner periphery 54C with six drive surfaces 54G and six blending curves 54H. It should be noted that the first and second peripheries are i) of substantially the same shape ii) are circumferentially orientated such that the drive surfaces 54E, 54G align and curves 54F and 54H also align iii) at lease some portions of the first periphery are aligned in the same axial plane as portions of the second periphery.

Although it is advantageous to have the conditions as set out in items i, ii, and iii above to provide for a compact design it is not necessary for the performance of the invention.

The plate 55 engages with the inwardly facing periphery 54C of the lip. On the axial side of the plate 54 remote from the lip there are ramped portions 54D (in this case 6 ramped portions). In this case friction plate 54 is manufactured from a sintering technique but this need not be the case.

d) friction plate 52 which has engaging hub portions 52A on its inner periphery (similar to those on plate 53) to engage rotationally fast with the hub 14. Plate 52 also has ramped portions 52D which face and interleave circumferentially between ramped portions 54D. On the side remote from ramped portions 52D there is a circumferential lip 52B which acts as a centralising lip in conjunction with belleville springs 51. In this case friction plate 52 is also made from sintering techniques but again this need not be the case.

e) belleville springs 51 f) thrust plate 56

It is apparent that plates 53 and 52, belleville springs 51 and thrust plate 56 all rotate with the input flywheel 11 and plates 54 and 55 both rotate with the output flywheel 12 as the flywheels 11 and 12 rotate relative to each other.

It may be advantageous for the non sintered friction components of the friction damper i.e. friction plates 53 and 55, to have a sintered coating applied to their friction surfaces to provide for different friction characteristics.

Note: to manufacture a component by a sintering technique a mixture of particles of metals and/or other materials is formed into a shape and then heated so that the particles fuse together to form a single component. A sintered coating is produced by enabling particles of metal and/or other materials to fuse onto the appropriate surfaces of the component to be coated.

Operation of the friction damper is as follows:—When the twin mass flywheel 10 is not transferring any torque between the associated engine and clutch the flywheels adopt a central or neutral position relative to each other (as shown in FIG. 1). In this position the ramped portions 54D and 52D are circumferentially interleaved and the belleville springs are in a relaxed state and are not axially biasing any of the friction damper components (though this need not be the case). The circumfereted extent of the ramps 54D and 52D such that a limited amount of relative rotation of the flywheels 11 and 12 either side of the neutral position is possible without the ramps 54D contacting corresponding ramps 52D.

However further relative rotation causes ramps 52D to ride up corresponding ramps 54D and friction plate 52 will move towards and then contact and compress belleville springs 51. Once the belleville springs are contacted, friction is generated between the relatively rotating components of the friction damper and this friction force increases as the belleville springs are compressed.

Note that there is a substantially annular area of plate 55 which faces plate 53 and which plate 53 sweeps past during relative rotation of the friction plates known hereafter as a swept area. The swept area of plate 55 which faces plate 53 is substantially annular since it does not include the axially orientated regions of the surface adjacent the apexes of the friction plate, these regions being at a larger diameter than the outer diameter of plate 53. The drive surfaces 55B are substantially tangential to this swept area and in particular are substantially tangential to the outer circumference of the swept area.

Figure 12:
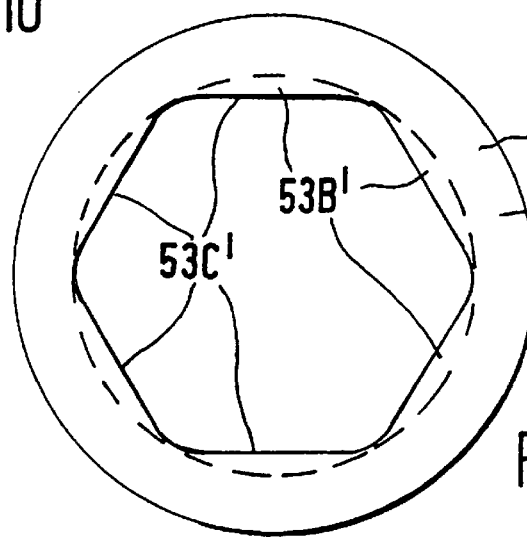
FIG. 12 is an axial view of an alternative friction plate.

FIG. 12 shows an alternative form of friction plate 53' similar to friction plate 53 except that the radially inner tabs 53A have been replaced by webs 53B' with drive surfaces 53C'. When this plate is used in the friction pack 50 in place of friction plate 53 its swept area 53D' (the internal edge of which is shown by a dotted line in FIG. 12) which faces plate 55 is also substantially annular since the axially orientated portions of the webs 53B are at a smaller diameter than the internal diameter of friction plate 55. The drive surfaces 53C are substantially chordal relative to swept area of friction plate 53' and in particular are substantially chordal relative to the inner edge of the swept area.

It should also be noted that the axial load generated by the belleville springs 51 passes directly into the inner race 19A of the bearing 19 via end surface 19A' and is ultimately reacted by plate 28. This allows some of the friction damper components (in this case the belleville springs 51 and thrust washer 56) to be mounted radially outboard of the abutment 14A thus providing for an axially compact design, with bearing inner race 19A axially secured between abutment 14A and plate 28.

Whilst the basic polygon shape of the peripheries 55A, 54A and 54J are all hexagons further regular or irregular basic polygon shapes could be used such as triangles, squares, pentagons, octagons etc.

Figure 8:
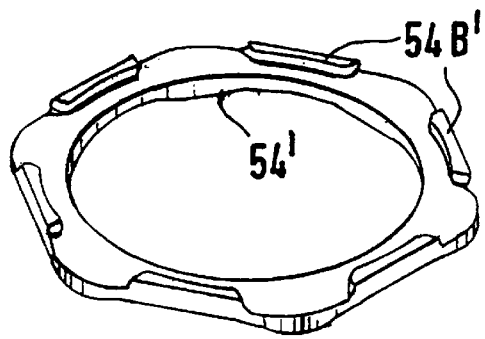
FIGS. 8 and 9 are isometric views of alternative friction plates
Figure 9:
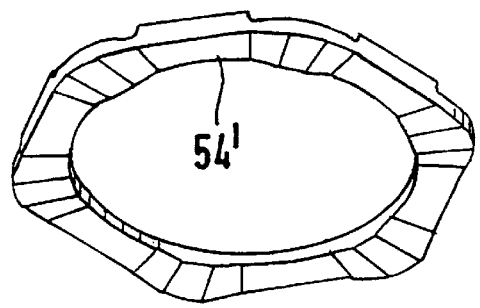

FIGS. 8 and 9 show an alternative design 54' of friction plate 54 in which instead of a continuous lip 54B there are circumferentially spaced lugs 54B' positioned circumferentially intermediate the apexes of the polygon shape and which project axially from the surface of the friction plate 54. Tags on a suitably modified friction plate (not shown) equivalent to plate 55 engage between the circumferential facing ends of adjacent lugs 54B' to transfer the friction drive to friction plate 54'. In this case friction plate 54 is sintered.

Figure 10:
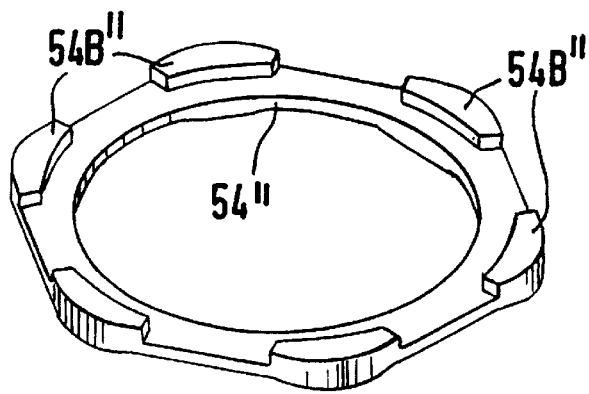
FIGS. 10 and 11 are isometric views of further alternative friction plates.
Figure 11:
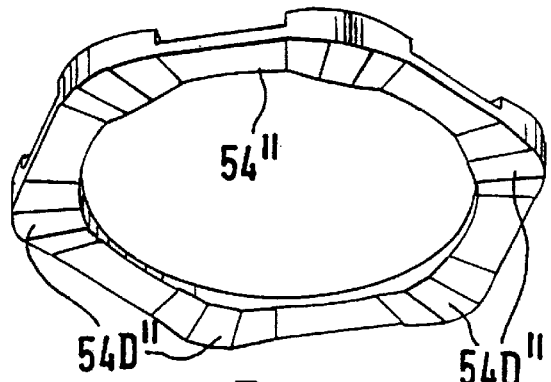

FIGS. 10 and 11 show an alternative design 54" of sintered friction plate 54' in which each lug 54" is positioned at a corresponding apex of two adjacent sides of the generally hexagonal outer profile of the plate 54". Note that on the side of the friction plate 54" remote from the lugs 541 there are ramped portions 43D". This results in the apexes being locally thickened and this can be advantageous, especially (as in this case) when the friction plate 54" is sintered.

It should be noted that friction plates 55, 53, 53', 54, 54' and 54" all have two swept areas one on each opposite axial side, whereas plate 15 and friction plate 52 only have one swept area.

The two swept areas of friction plate 54 are of different outer diameters since the outer diameter of adjacent friction plate 53 is smaller than the outer diameter of the other adjacent friction plate 52 (see FIG. 1). Nevertheless the drive surface 54E is still substantially tangential to the outer diameters of both of the swept areas, albeit that surface 54E is positioned outboard (by approximately the radial extent of the lip 54B) of the outer diameter of the swept area of friction plate 54 which faces friction plate 53. This is also the case with friction plates 54' and 54" which (when installed in a friction pack) also have two swept areas of different outer diameter.

What is claimed is:

1. A twin mass flywheel comprising a first mass and a second mass arranged for relative rotation about a common axis, the relative rotation of the masses being controlled, at least in part, by a friction damper, said friction damper comprising at least one friction plate rotatable about said common axis and having a shaped radially outer or radially inner first peripheral surface which cooperates with a similarly shaped peripheral surface of a first further component to transfer torque between said first further component and said at least one friction plate, said first further component being arranged for rotation with one of said flywheel masses, said shaped first peripheral surface of said at least one friction plate comprising a plurality of drive surfaces, at least one of said drive surfaces being substantially tangential or chordal to a circle drawn concentric with said common axis.

2. A twin mass flywheel as defined in claim 1 in which said at least one drive surface is substantially tangential or chordal to an inner or outer circumference of a swept surface area of the friction plate.

3. A twin mass flywheel as defined in claim 1 in which said first peripheral surface of said at least one friction plate is of generally hexagonal shape.

4. A twin mass flywheel as defined in claim 1 in which the contour of adjacent drive surfaces are blended into each other by a curve or similar profile.

5. A twin mass flywheel as defined in claim 1 in which said at least one friction plate has integrally formed axially acting ramps.

6. A twin mass flywheel as defined in claim 1 in which said at least one friction plate is formed by a sintering process.

7. A twin mass flywheel as defined in claim 1 in which said at least one friction plate has shaped first drive formations which co-operate with correspondingly shaped second drive formations of a second further component to transfer torque between said at least one friction plate and said second further component, said first drive formations being formed as axially projecting lugs on an axially orientated surface of said at least one friction plate.

8. A twin mass flywheel as defined in claim 7 in which said shaped first peripheral surface and said first drive formations are at least partially aligned in the same plane.

9. A twin mass flywheel as defined in claim 1 in which said at least one friction plate also has a shaped radially inner or radially outer second peripheral surface which co-operates with a similarly shaped peripheral surface of a second further component to transfer torque between said at least one friction plate and said second further component, said shaped second peripheral surface of said at least one friction plate comprising a plurality of second drive surfaces, at least one of said second drive surfaces being substantially tangential or chordal to a circle drawn concentric with said common axis.

10. A twin mass flywheel as defined in claim 9 in which said shaped first and second peripheral surfaces of said at least one friction plate are of substantially the same profile.

11. A twin mass flywheel as defined in claim 9 in which at least a portion of said shaped first and second peripheral surfaces of said at least one friction plate are arranged on opposite sides of an axially orientated lip of said at least one friction plate.

12. A twin mass flywheel as claimed in claim 1 in which said first peripheral surface of said at least one friction plate is of generally polygon shape.

13. A twin mass flywheel as defined in claim 12 in which said at least one friction plate has shaped first drive formations which co-operate with correspondingly shaped second drive formations of a second further component to transfer torque between said at least one friction plate and said second further component, said first drive formations being formed as axially projecting lugs on an axially orientated surface of said at least one friction plate, said axially projecting lugs being positioned substantially at the apexes of the generally polygonal shape.

14. A twin mass flywheel as defined in claim 13 in which said shaped first peripheral surface and said axially projecting lugs are at least partially aligned in the same plane.

15. A twin mass flywheel as defined in claim 1 in which said at least one friction plate has shaped first drive formations which co-operate with correspondingly shaped second drive formations of a second further component to transfer torque between said at least one friction plate and said second further component, said first drive formations being formed as circumferentially spaced axially projecting lugs on a first axially orientated surface of said at least one friction plate, said at least one friction plate also having a plurality of circumferentially spaced axially acting ramps on a second axially orientated surface thereof.

16. A twin mass flywheel as defined in claim 15 in which there are an equal number of axially acting ramps and projecting lugs and the axially acting ramps are provided substantially opposite the axially projecting lugs.

17. A twin mass flywheel as defined in claim 16 in which said at least one friction plate is of generally polygonal shape and the axially acting ramps and axially projecting lugs are positioned substantially at the apexes of the generally polygon shape.

\* \* \* \* \*